United States Patent
Dubs et al.

(10) Patent No.: US 11,203,928 B2
(45) Date of Patent: Dec. 21, 2021

(54) WELLBORE PRESSURE SURGE SIMULATION SYSTEMS, METHODS TO PERFORM SURGE SIMULATIONS, AND METHODS TO CONFIGURE PRESSURE SURGE SIMULATION SYSTEMS

(71) Applicant: Halliburton Energy Services, Inc., Houston, TX (US)

(72) Inventors: Liam Dubs, Fort Worth, TX (US); Jacob Andrew McGregor, Fort Worth, TX (US); Brenden Michael Grove, Mansfield, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 124 days.

(21) Appl. No.: 16/685,981

(22) Filed: Nov. 15, 2019

(65) Prior Publication Data

US 2021/0102460 A1 Apr. 8, 2021

Related U.S. Application Data

(60) Provisional application No. 62/811,712, filed on Oct. 7, 2019.

(51) Int. Cl.
*E21B 49/00* (2006.01)
*E21B 21/10* (2006.01)
(Continued)

(52) U.S. Cl.
CPC ............ *E21B 49/008* (2013.01); *E21B 21/08* (2013.01); *E21B 21/10* (2013.01); *E21B 49/02* (2013.01);
(Continued)

(58) Field of Classification Search
CPC .... E21B 21/00–01; E21B 21/08; E21B 21/10; E21B 31/00–03; E21B 49/00;
(Continued)

(56) References Cited

U.S. PATENT DOCUMENTS 5,079,948 A 1/1992 Collins et al.
5,297,420 A * 3/1994 Gilliland ................ G01N 15/08
73/38

(Continued)

OTHER PUBLICATIONS

International Search Report and Written Opinion issued in corresponding International Application No. PCT/US2019/063090, dated Jul. 6, 2020.

*Primary Examiner* — Nguyen Q. Ha
(74) *Attorney, Agent, or Firm* — McGuireWoods LLP

(57) ABSTRACT

Wellbore pressure surge simulation systems, methods to perform pressure surge simulations, and methods to configure pressure surge simulation systems are disclosed. A wellbore pressure surge simulation system includes a core chamber configured to store a core sample of a downhole formation inside the core chamber. The wellbore pressure surge simulation system also includes a fluid chamber that is fluidly connected to the core chamber and having a first compartment that is configured to store a first fluid and a second compartment that is configured to store a second fluid. The wellbore pressure surge simulation system further includes a wellbore chamber positioned adjacent to the core chamber and configured to store the first fluid. The wellbore pressure surge simulation system further includes a flow restrictor configured to restrict fluid flow from the wellbore chamber.

20 Claims, 6 Drawing Sheets

(51) Int. Cl.
　　　*E21B 21/08* (2006.01)
　　　*E21B 49/02* (2006.01)
　　　*G01N 15/08* (2006.01)

(52) U.S. Cl.
　　　CPC ..... *G01N 15/0806* (2013.01); *G01N 15/0826* (2013.01)

(58) Field of Classification Search
　　　CPC .. E21B 49/008; E21B 49/02; E21B 49/08–10; G01N 15/00; G01N 15/08; G01N 15/0806; G01N 15/0826
　　　See application file for complete search history.

(56) References Cited

U.S. PATENT DOCUMENTS

| | | |
|---|---|---|
| 2010/0161229 A1 | 6/2010 | Georgi et al. |
| 2016/0138394 A1 | 5/2016 | Brooks et al. |
| 2019/0226970 A1 | 7/2019 | Dusterhoft et al. |
| 2019/0234859 A1 | 8/2019 | Chen et al. |

\* cited by examiner

WELLBORE PRESSURE SURGE SIMULATION SYSTEMS, METHODS TO PERFORM SURGE SIMULATIONS, AND METHODS TO CONFIGURE PRESSURE SURGE SIMULATION SYSTEMS

CROSS-REFERENCE TO RELATED APPLICATIONS

This U.S. Non-Provisional Application claims priority to and benefit of U.S. Provisional Application No. 62/911,712, filed Oct. 7, 2019, the disclosure of which is incorporated by reference herein in its entirety.

BACKGROUND

The present disclosure relates generally to wellbore pressure surge simulation systems, methods to perform pressure surge simulations, and methods to configure pressure surge simulation systems.

Fluids are sometimes injected through perforations of a downhole formation during certain well operations to clean up unwanted particles in the perforations. More particularly, a pressurized fluid is surged from the formation, through the perforations, and into a region of a wellbore. This is sometimes achieved by introducing an empty chamber into the downhole environment, then opening a valve on the chamber to allow wellbore fluids to fill the chamber.

BRIEF DESCRIPTION OF THE DRAWINGS

Illustrative embodiments of the present disclosure are described in detail below with reference to the attached drawing figures, which are incorporated by reference herein, and wherein.

Figure 1:
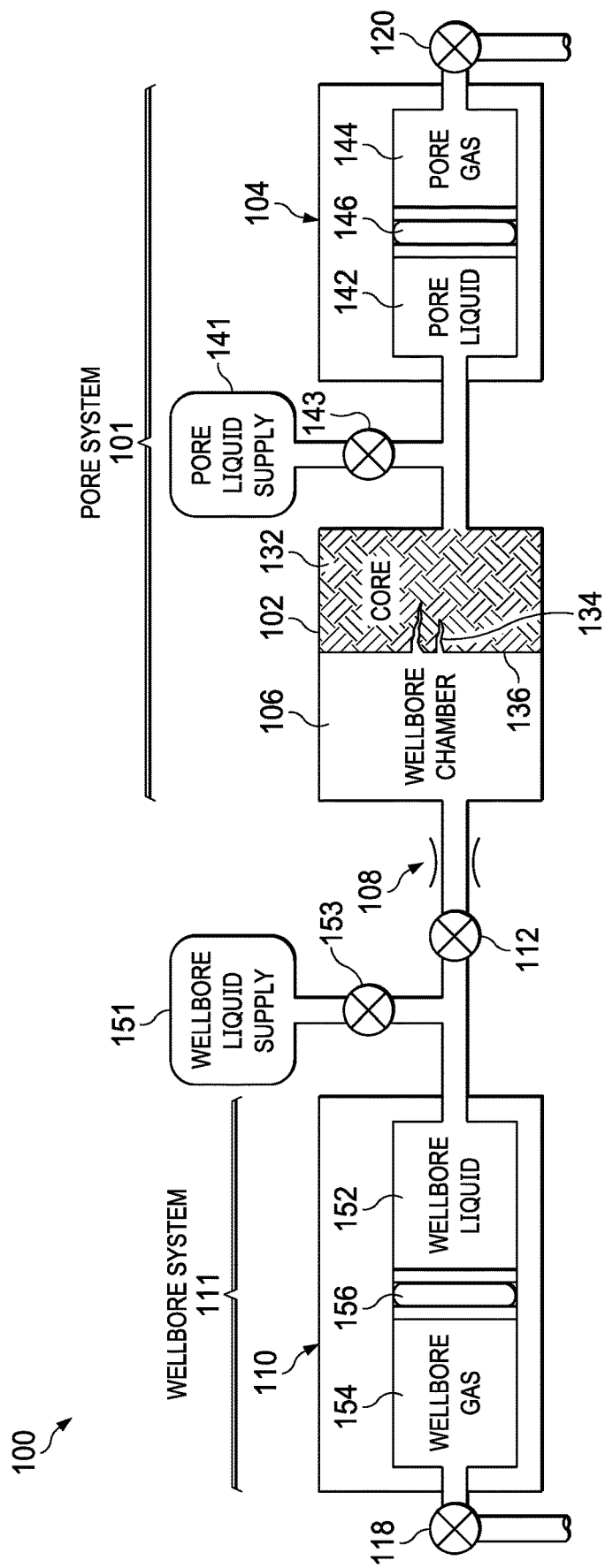
FIG. 1 is a schematic, cross-sectional view of a wellbore pressure surge simulation system.

The illustrated figures are only exemplary and are not intended to assert or imply any limitation with regard to the environment, architecture, design, or process in which different embodiments may be implemented.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to wellbore pressure surge simulation systems, methods to perform pressure surge simulations, and methods to configure pressure surge simulation systems. A wellbore pressure surge simulation system includes a core chamber that is configured to store a core sample of a formation sample during pressure simulation operations described herein. In some embodiments, the core sample is perforated to simulate downhole perforations formed during well operations. The wellbore pressure surge simulation system also includes a first fluid chamber (pore fluid chamber) having a first compartment that stores a first fluid (a pore liquid) and a second compartment that stores a second fluid (a pore gas). In some embodiments, the first fluid chamber also includes a movable barrier that separates the first compartment and the second compartment. Additional illustrations of the first fluid chamber are provided in FIGS. 1-3.

The wellbore pressure surge simulation system also includes a wellbore chamber that is configured to store the pore liquid during pressure simulation operations, and a flow restrictor that is configured to reduce fluid flow out of the wellbore chamber to a threshold flow rate (e.g., one liter per minute, one milliliter per minute, zero, or a different threshold flowrate). Further, a flow restrictor is any device configured to reduce fluid flow. Examples of flow restrictors include, but are not limited to, needle valves, orifice plates, as well as other devices configured to reduce fluid flow. In some embodiments, the core chamber and the wellbore chamber are compartments of a single chamber. In some embodiments, the core chamber, the wellbore chamber, and the pressure fluid chamber are components of a pore system that is described herein.

Prior to the start of a pressure surge simulation operation, a desired amount of the pore liquid flows into the first compartment, into the core chamber, and through the perforations of the core sample into the wellbore chamber. A desired amount of the pore gas flows into the second compartment. Pressure from the pore gas against the barrier that separates the first compartment and the second compartment pressurizes the pore liquid. In some embodiments, the amount of the pore liquid and the pore gas that are introduced into the pore system are based on the desired pressure of the pore liquid prior to the start of the pressure surge simulation operation. Additional descriptions of pressurizing the pore liquid are provided in the paragraphs below.

In some embodiments, the wellbore pressure surge simulation system includes a second fluid chamber (wellbore fluid chamber) having a first compartment configured to a third fluid (a wellbore liquid) and a fourth compartment configured to store a fourth liquid (a wellbore gas). In one or more of such embodiments, the second fluid chamber also includes a movable barrier that separates the third compartment from the fourth compartment. The wellbore pressure surge simulation system also includes a valve that is initially shut to prevent fluid communication between the second fluid chamber and the wellbore chamber. In some embodiments, the second fluid chamber and the valve are components of a wellbore system described herein. Prior to the start of the pressure surge simulation operation, a desired amount of wellbore liquid is introduced into the first compartment of the second fluid chamber. A desired amount of the wellbore gas is then introduced into the second compartment of the second fluid chamber. Pressure from the wellbore gas against the barrier that separates the first compartment and the second compartment of the second fluid chamber pressurizes the wellbore liquid. In some embodiments, the amount of the wellbore liquid and the wellbore gas that are introduced into the wellbore system are based on the desired pressure of the wellbore liquid prior to the start of the pressure surge simulation operation. In some embodiments, the desired pressure of the wellbore liquid is less than the desired pressure of the pore liquid. Additional descriptions of pressurizing the wellbore liquid are provided in the paragraphs below.

In some embodiments, the wellbore pressure surge simulation system includes a surge chamber that is configured to receive the pressurized pore fluid and a second valve that is initially shut to prevent fluid communication between the wellbore chamber and the surge chamber. In some embodiments, the wellbore pressure surge simulation system is configured to be based on the amount of surge flow through the wellbore pressure surge simulation system. In one or more of such embodiments, surge flow through the wellbore pressure surge simulation system is varied by varying the differential pressure (e.g., by decreasing the differential pressure or increasing the differential pressure), controlling the flowrate through the perforations, by adjusting the compressibility of the system, and by other operations described herein. Additional descriptions of components of wellbore pressure surge simulation systems and configurations of the wellbore pressure surge simulation systems are provided in the paragraphs below and are illustrated in at least FIG. 1.

Pressure surge simulation operations include inducing a differential pressure between the wellbore and the pore. In some embodiments, a set of valves is used to isolate the wellbore and pore pressures to prevent the two pressures from equalizing. In one or more of such embodiments, an isolation valve between the wellbore and the pore is opened once the target pressures are reached. The differential pressure forces fluids to surge through the perforations. Perforation tunnel debris is obtained by the wellbore and is filtered and dried for analysis. Additional examples of wellbore pressure surge simulation systems and methods to perform pressure surge simulations are provided in the paragraphs below.

Figure 2:
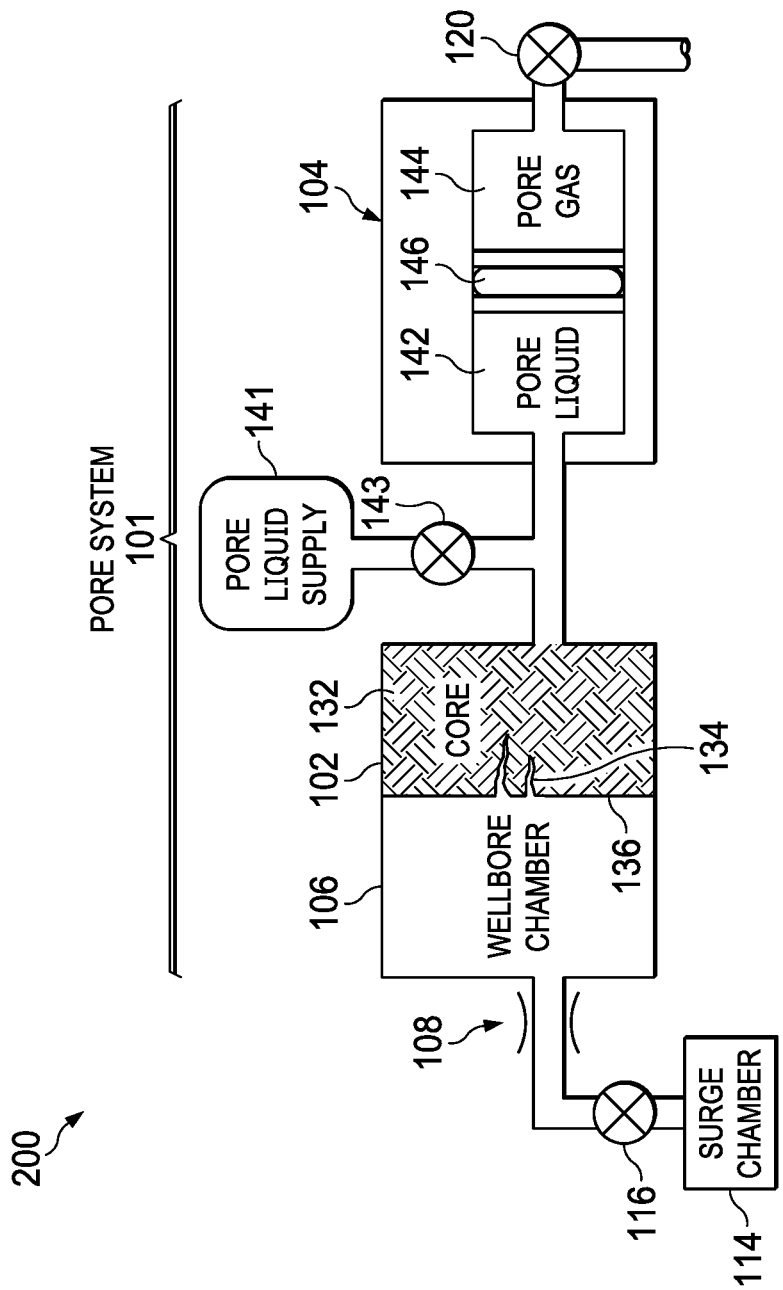
FIG. 2 is a schematic, cross-sectional view of another wellbore pressure surge simulation system that is similar to the wellbore pressure surge simulation system of FIG. 1.
Figure 3:
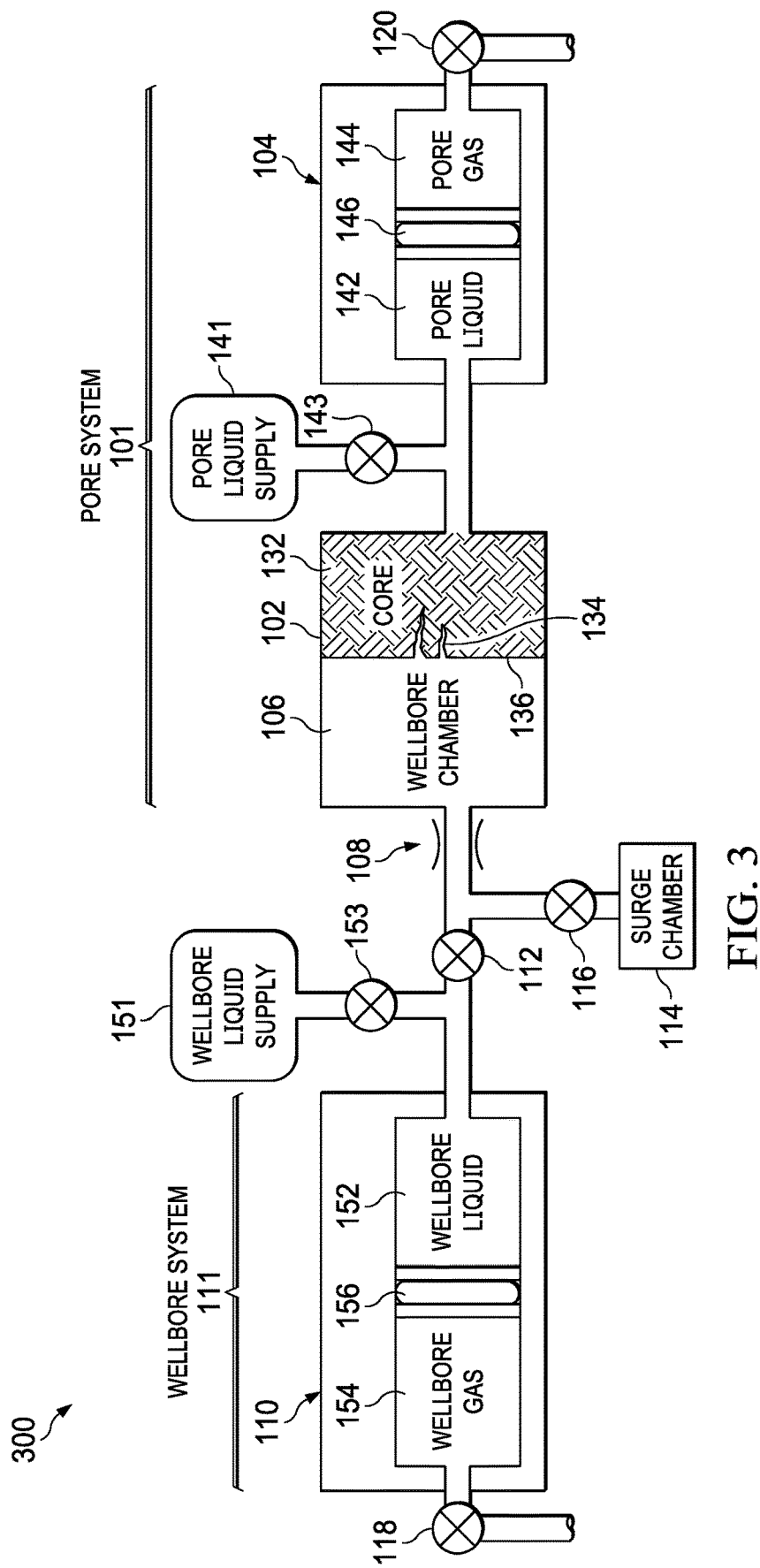
FIG. 3 is a schematic, cross-sectional view of another wellbore pressure surge simulation system that is similar to the wellbore pressure surge simulation system of FIG. 1.

Turning now to the figures, FIG. 1 is a schematic, cross-sectional view of a wellbore pressure surge simulation system 100. In the illustrated embodiment of FIG. 1, wellbore pressure surge simulation system 100 includes a pore system 101 that includes a core chamber 102, and a first fluid chamber 104 (e.g., a pore fluid chamber). In the embodiment of FIG. 1, a core sample 132 of a formation core having perforations 134 is stored in core chamber 102. Further, core chamber 102 and a wellbore chamber 106 are separated by a sample casing 136, which has been perforated to provide pressure communication between core chamber 102 and wellbore chamber 106, and to facilitate fluid flow from core chamber 102 to wellbore chamber 106. In the illustrated embodiment of FIG. 1, core chamber 102 is fluidly connected to first fluid chamber 104, which contains a first compartment 142 and a second compartment 144 that is separated from first compartment 142 by a movable barrier 146. In some embodiments, barrier 146 is a piston, a rubber membrane, or another material that separates first compartment 142 from second compartment 144. In the embodiments of FIGS. 1-3, first fluid chamber 104 is referred to as a pore fluid chamber having a first compartment that stores a pore liquid and a second compartment that stores a pore fluid. In some embodiments, barrier 146 is movable within first fluid chamber 104 to maintain a pressure equilibrium between fluids in first compartment 142 and second compartment 144. First fluid chamber 104 is also fluidly connected to a fluid container 141 that stores a first fluid, where the first fluid is any type of liquid or gas. In the embodiment of FIG. 1, the first fluid is a pore liquid.

Prior to the start of a pressure surge simulation operation, valve 143 is turned from a first position to a second position to allow a desired amount of the pore liquid to flow from fluid container 141 into first compartment 142, core chamber 102, and wellbore chamber 106 of pore system. In some embodiments, the desired amount of the pore liquid that is injected into pore system 101 is determined based on the desired amount of the pore liquid to be surged from pore system 101 during the pressure surge simulation operation. In some embodiments, pressure from the pore liquid shifts barrier 146, thereby increasing the volume of first compartment 142 and decreasing the volume of second compartment 144. In one or more of such embodiments, the amount of pressure applied to barrier 146 and the amount of increase in the volume of first compartment 142 are based on the desired amount of the pore liquid that is injected into pore system 101.

In the embodiment of FIG. 1, first fluid chamber 144 is fluidly coupled to a valve 120 that is initially in a closed position. In one or more of such embodiments, after the desired amount of the pore liquid is injected into pore system 101, valve 120 is turned from a closed position to an open position to inject a second fluid into second compartment 144 of first fluid chamber 104, where second compartment 144 simulates a "far-field" reservoir. Second fluid is any liquid or gas that is injectable into second compartment 144. In the embodiment of FIG. 1, second fluid is a pore gas. As the second fluid is injected into second compartment 144, pressure from the second fluid on barrier 146 pressurizes the pore liquid. In some embodiments, pore system 101 is pressurized to a pressure that is approximately equal to a desired downhole pressure. In some embodiments, the exterior of core sample 132 is subject to additional external confining or overburden stress. A restrictor 108 is fluidly coupled to pore system 101 and is configured to reduce fluid flow out of pore system 101. In some embodiments, restrictor 108 is also configured to reduce fluid flow into pore system 101. In some embodiments, a filter (not shown) is coupled to restrictor 108 to prevent particles greater than a threshold size from flowing into restrictor 108.

In the embodiment of FIG. 1, wellbore pressure surge simulation system 100 also includes a wellbore system 111 that contains a second fluid chamber 110 (wellbore fluid chamber) and a valve 112. In the illustrated embodiment of FIG. 1, second fluid chamber 110 contains a first compartment 152 and a second compartment 154 that is separated from first compartment 152 by a movable barrier 156. In some embodiments, barrier 156 is a piston, a rubber membrane, or another material that separates first compartment 152 from second compartment 154. In some embodiments, barrier 156 is movable within second fluid chamber 110 to maintain a pressure equilibrium between fluids in first compartment 152 and second compartment 154 of second fluid chamber 110. First compartment 152 is also fluidly connected to a fluid container 151 that stores a third fluid, which in the embodiment of FIG. 1, is a wellbore liquid. Prior to the start of a pressure surge simulation operation, valve 153 is turned from a first position to a second position to allow a desired amount of the wellbore liquid to flow from fluid container 151 into first compartment 152 of second fluid chamber 110. In some embodiments, the desired amount of the wellbore liquid that is injected into wellbore system 111 is determined based on the desired amount of the pore liquid to be surged from pore system 101 during the pressure surge simulation operation. In some embodiments, pressure from the wellbore liquid shifts barrier 156, thereby increasing the volume of first compartment 152 and decreasing the volume of second compartment 154. In one or more of such embodiments, the amount of pressure applied to barrier 156 and the amount of increase in the volume of first compartment 152 are based on the desired amount of the wellbore liquid that is injected into wellbore system 111.

In the embodiment of FIG. 1, second fluid chamber 110 is fluidly coupled to a valve 118 that is initially in a closed position. In one or more of such embodiments, after the desired amount of the wellbore liquid is injected into wellbore system 111, valve 118 is turned from a closed position to an open position to inject a fourth fluid into second compartment 154 of second fluid chamber 110, where second compartment 154 simulates a "far-field" reservoir. In the embodiment of FIG. 1, the fourth fluid is a wellbore gas. As the wellbore gas is injected into second compartment 154, pressure from the pore gas on barrier 156 pressurizes the pore gas. In some embodiments, wellbore system 111 is initially pressurized to a pressure that is less than the pressure of pore system 101 to establish a pressure differential between the two systems 101 and 111. Valve 112 is also initially in a closed position to reduce or prevent fluid communication between wellbore system 111 and pore system 101. During one or more wellbore pressure simulation operations described herein, valve 112 is turned from the closed position to an open position to establish fluid communication between wellbore system 111 and pore system 101. In some embodiments, wellbore system 111 (e.g., first compartment 152) is used as a surge tank after valve 112 is opened due to the pressure differential between wellbore system 111 and pore system 101. In one or more of such embodiments, the pore liquid flows to second fluid chamber 110, through restrictor 108, and into first compartment 152 of second fluid chamber 110 at a flow rate controlled by restrictor 108. In some embodiments, valve 112 is opened after completion of one or more pressure surge operations described herein to facilitate post surge unloading of a test apparatus and to reduce or eliminate undesired fluid flow through formation core 132, where unloading of a test apparatus is depressurizing the respective apparatus from the elevated test-time conditions, to ambient conditions.

In some embodiments, the first fluid (pore liquid) and the third fluid (wellbore liquid) are in the same phase. In some embodiments, the first fluid and the third fluid are the same fluid pressurized at different pressures. Although FIG. 1 illustrates movable barrier 146 positioned between first compartment 142 and second compartment 144, in some embodiments, first fluid chamber 104 does not include a movable barrier. In one or more of such embodiments, a single homogeneous fluid is injected into first fluid chamber 104. Similarly, in some embodiments, movable barrier 156 is not positioned between first compartment 152 and second compartment 154 of second fluid chamber 110. In one or more of such embodiments, a single homogeneous fluid is injected into second fluid chamber 110. Although the foregoing paragraphs describe injecting a pore liquid into first compartment 142, in some embodiments, another type of liquid or gas (e.g., a pore gas) is injected into first compartment 142. Further, in some embodiments, the pore fluid is only injected into core chamber 102. In one or more of such embodiments, the pore fluid is injected into core chamber 102 then flows from core chamber 102 into first compartment 142 and into wellbore chamber 102. Similarly, although the foregoing paragraphs describe injecting a wellbore liquid into first compartment 152, in some embodiments, another type of liquid or gas (e.g., a wellbore gas) is injected into first compartment 152. Further, in some embodiments, both the pore liquid and the wellbore liquid are replaced by a pore gas and a wellbore gas, respectively. Further although FIG. 1 illustrates valve 112, in some embodiments, rupture disks, explosively-actuated devices, or other types of covers or devices that are configured to switch to an open position to provide fluid communication are used in lieu of valve 112. Additional configurations of wellbore pressure surge simulation systems, such as wellbore pressure surge simulation system 100 of FIG. 1, are provided in the paragraphs below.

FIG. 2 is a schematic, cross-sectional view of another wellbore pressure surge simulation system 200 that is similar to wellbore pressure surge simulation system 100 of FIG. 1. Pore system 101 of wellbore pressure surge simulation system 200 is identical to pore system 101 of wellbore pressure surge simulation system 100 of FIG. 1 and described above.

In the embodiment of FIG. 2, wellbore pressure surge simulation system 200 does not include wellbore system 111 of FIG. 1. Further, wellbore pressure surge simulation system 200 includes a surge chamber 114 that is configured to receive fluids, such as the pressurized pore liquid and other fluids that are in wellbore chamber 106. In some embodiments, surge chamber 114 is pressurized at a lower pressure than the pressure of pore system 101. In one or more of such embodiments, the pressure inside surge chamber 114 is initially zero or near zero (vacuum) or another value that is less than the pressure of pore system 101. Wellbore pressure surge simulation system 200 also includes a valve 116 that is also initially in a closed position to reduce or prevent fluid communication between pore system 101 and surge chamber 114, and to prevent the first fluid (e.g., pore liquid) or other fluids in wellbore chamber 106 from flowing into surge chamber 114. During one or more wellbore pressure simulation operations described herein, valve 116 is turned from the closed position to an open position to establish fluid communication between pore system 101 and surge chamber 114.

FIG. 3 is a schematic, cross-sectional view of another wellbore pressure surge simulation system 300 that is similar to the wellbore pressure surge simulation system 100 of FIG. 1, where wellbore pressure surge simulation system 300 includes pore system 101, wellbore system 111, and surge chamber 114. In the embodiment of FIG. 3, surge chamber 114 is also configured to receive fluid from second fluid chamber 110 after valve 112 is opened. Further, where valve 112 is in an open position, valve 116 is also configured to prevent the third fluid (e.g., wellbore liquid) from flowing into surge chamber 114 while valve 116 is in a closed position. In some embodiments, wellbore pressure surge simulation systems 100, 200, and 300 of FIGS. 1-3 are components of a pressure vessel. In some embodiments, API RP19B Section 2 and API RP19B Section 4 tests are performed in pressure surge simulation systems 100, 200, and 300 of FIGS. 1-3.

Figure 4:
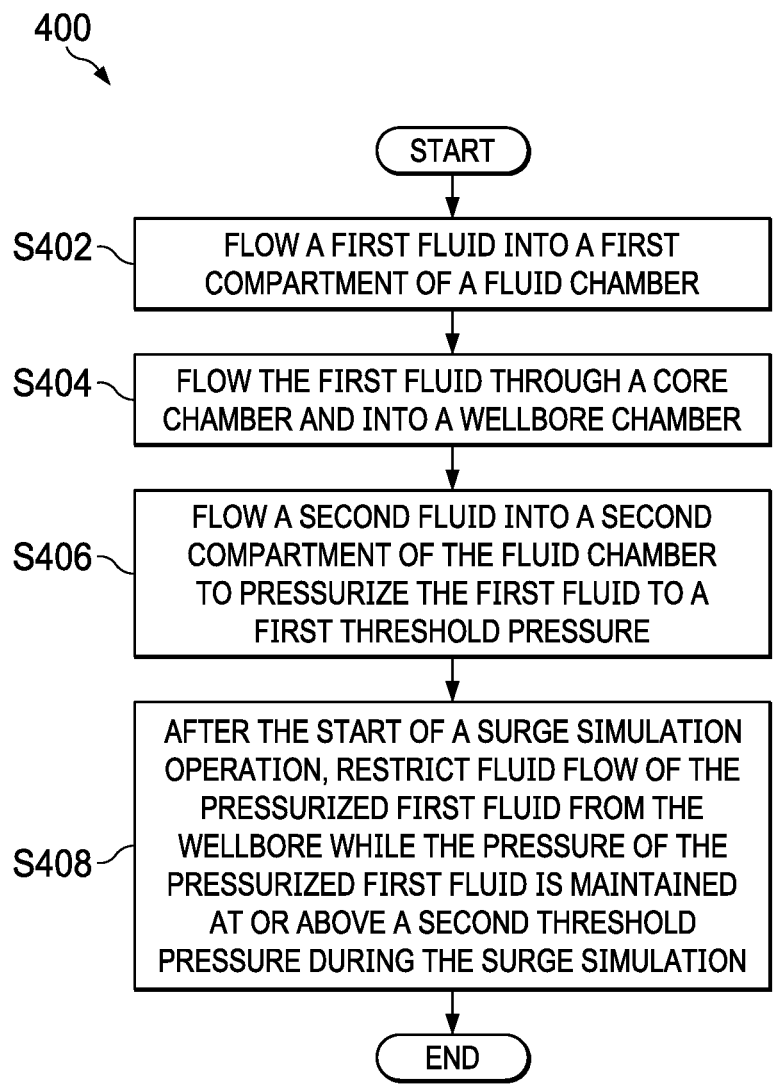
FIG. 4 is a flow chart of a process to perform a pressure surge simulation.

FIG. 4 is a flow chart of a process 400 to perform a pressure surge simulation. Although the operations in the process 400 are shown in a particular sequence, certain operations may be performed in different sequences or at the same time where feasible. In some embodiments, the operations of process 400 are performed in a pressure vessel.

At block S402, a first fluid flows into a first compartment of a fluid chamber. In the embodiments of FIGS. 1-3, valve 143 is turned to an open position to flow a pore liquid from fluid container 141 into first compartment 142 of first fluid chamber 104. At block S404, the first fluid flows through core chamber into a wellbore chamber. In the embodiments of FIGS. 1-3, the pore liquid also flows into core chamber 102, through perforations 134 of core sample 132, and into wellbore chamber 106. In some embodiments, a desired amount of the first fluid to be surged during the pressure surge simulation operation is determined, and at least the desired amount of the first fluid injected into the first compartment, the core chamber, and the wellbore chamber.

At block S406, a second fluid flows into a second compartment of the fluid chamber to pressurize the first fluid to a first threshold pressure. In the embodiments of FIGS. 1-3, valve 120 is turned to an open position to flow a pore gas into second compartment 144. As the pore gas is injected into second compartment 144, pressure from the pore gas pushes barrier 146, which in turn, pushes against the pore liquid in first compartment 142, thereby pressurizing the pore liquid. In some embodiments, a desired pressure of the first fluid (pressurized first fluid) is determined, an amount of the second fluid that, when injected into the second chamber, would pressurize the first fluid to the desired pressure is determined, and the amount of the second fluid is injected into the second compartment. In one or more of such embodiments, the amount of the second fluid to inject into the second chamber is based on the amount of the first fluid in the first compartment, the core chamber, and the wellbore chamber.

In the embodiments of FIGS. 1 and 3, wellbore pressure surge simulation systems 100 and 300 also include a second fluid chamber 110. In the embodiments of FIGS. 1 and 3, valve 153 is turned to an open position to flow a third fluid (wellbore liquid) from fluid container 151 into first compartment 152 of second fluid chamber 110. At block S404, the first fluid flows through a core chamber into a wellbore chamber. In one or more of such embodiments, a desired amount of the first fluid to be surged during the pressure surge simulation operation is determined based on the volume of first compartment 152 and the volume of the pressurized first fluid to be injected into first compartment 152 during the pressure surge simulation operation. Further, a fourth fluid (e.g., a wellbore gas) is injected into a second compartment of second fluid chamber 110 to pressurize the third fluid to a threshold pressure. In that regard, valve 118 of the embodiments of FIGS. 1 and 3 is turned to an open position to flow the wellbore gas into second compartment 154 of second fluid chamber 110. As the wellbore gas is injected into second compartment 154, pressure from the wellbore gas pushes barrier 156, which in turn pushes against the wellbore liquid in first compartment 152, thereby pressurizing the wellbore liquid. In some embodiments, a desired pressure of the third fluid (pressurized third fluid) is determined, an amount of the fourth fluid that, when injected into second chamber 154, would pressurize the third fluid to the desired pressure is determined, and the amount of the fourth fluid is injected into second compartment 154 of second fluid chamber 110. In some embodiments, the desired pressure of the pressurized third fluid is less than the pressure of the pressurized first fluid. In one or more of such embodiments, the desired pressure of the pressurized third fluid is less than the equilibrium pressure of the wellbore pressure surge simulation system after completion of the pressure surge simulation operation.

In the embodiments of FIGS. 2 and 3, wellbore pressure surge simulation systems 200 and 300 also include a surge chamber 114. In one or more of such embodiments, surge chamber 114 is pressurized at a lower pressure than the pressure of pore system 101 of FIG. 1. In one or more of such embodiments, the pressure inside surge chamber 114 is initially zero or near zero (vacuum) or another value that is less than the pressure of pore system 101.

Prior to the start of the pressure surge simulation operation, the pressurized first fluid is prevented from flowing out of wellbore chamber 106 of FIGS. 1-3. In that regard, valve 112 of FIGS. 1 and 3, and valve 116 of FIGS. 2 and 3 are initially at close positions to prevent fluid flow out of wellbore chamber 106. At block S408, and after the start of the pressure surge simulation operation, fluid flow of the pressurized first fluid from the wellbore chamber is restricted to a threshold rate while the pressure of the pressurized first fluid is maintained at or above a second threshold pressure during the pressure surge simulation operation. In one or more embodiments, the second threshold pressure is a desired equilibrium pressure of the wellbore pressure surge simulation system after completion of the pressure surge simulation operation. The pressurized first fluid flow through restrictor 108 of FIGS. 1-3, which controls the flow rate of the pressurized first fluid to flow out of wellbore chamber 106 at a desired flow rate. In the embodiment of FIG. 1, valve 112 is turned to an open position to fluidly connect pore system 101 with second fluid chamber 110 of FIG. 1. The pressure differential between the first pressurized fluid and the third pressurized fluid, which has less pressure than the first pressurized fluid, causes the first pressurized fluid to flow into first compartment 152 of second fluid chamber 110. In the embodiment of FIG. 2, valve 116 is turned to an open position to fluidly connect pore system 101 with surge chamber 114. The pressure differential between pore system 101 and surge chamber 114 causes the first pressurized fluid to flow into surge chamber 114.

Figure 5:
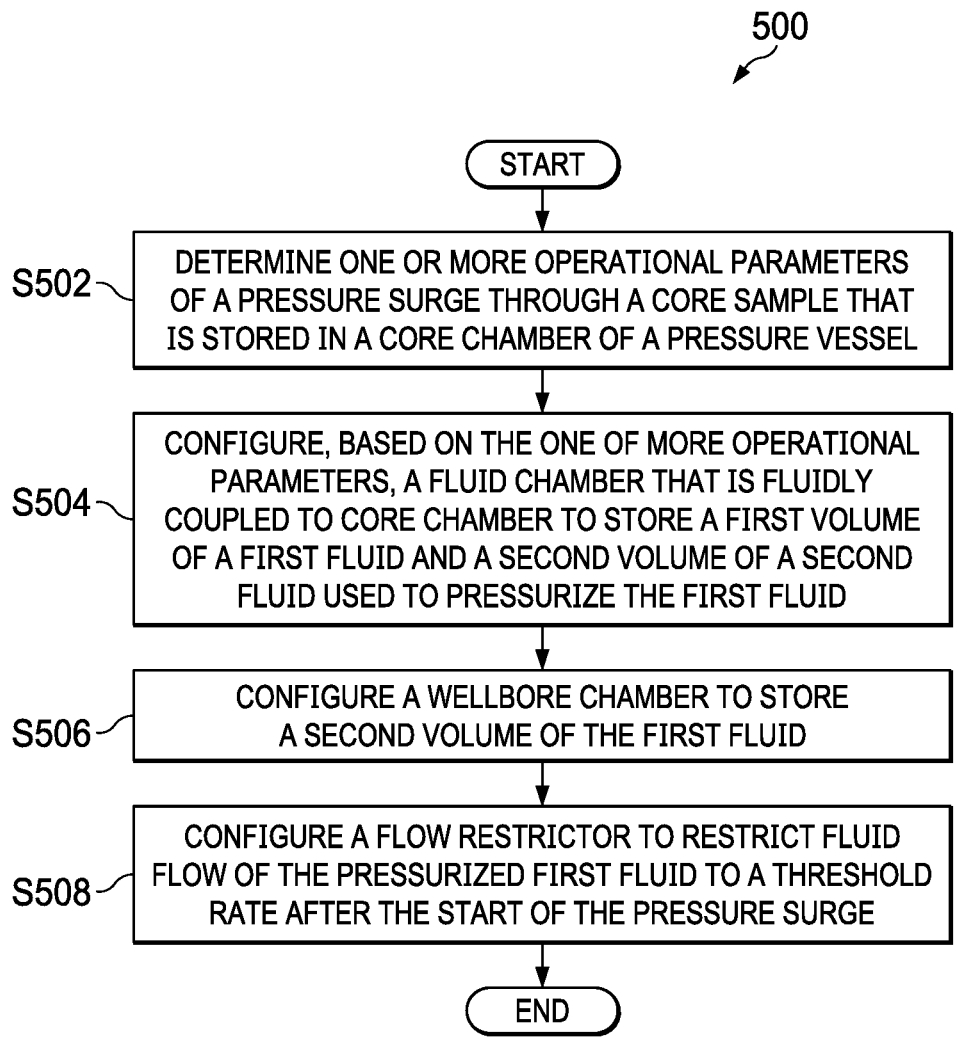
FIG. 5 is a flow chart of a process to configure a wellbore pressure surge simulation system.

FIG. 5 is a flow chart of a process 500 to configure a wellbore pressure surge simulation system, such as wellbore pressure surge simulation systems 100, 200, and 300 of FIGS. 1-3. Although the operations in the process 500 are shown in a particular sequence, certain operations may be performed in different sequences or at the same time where feasible.

At block S502, one or more operational parameters of a pressure surge simulation operation through a core sample that is stored in a core chamber of a pressure vessel are determined. An operational parameter refers to guidelines on how to perform the surge operation. Examples of operational parameters include, but are not limited to, a desired pore system pressure before the pressure surge simulation operation, a desired wellbore system pressure before the pressure surge simulation operation, the desired equilibrium pressure after completion of the pressure surge simulation operation, types of fluids injected into the first and second compartments of the first and second fluid chambers, the total fluid volume to be surged through the core, the desired volume of fluids to be injected into the first and second compartments of the first and second fluid chambers, the desired fluid flow rate during the surge, the desired duration of the fluid surge, a threshold amount of reduction in the pressure of the pore system during the pressure surge operation, as well as other user input, operational, or safety guidelines. In some embodiments, the threshold pressure of the pore system, such as pore system 101 of FIG. 1, is the minimum amount of pressure of the pore system during a pressure surge operation. In some embodiments, the threshold pressure of the pore system is the maximum allowable pressure reduction in the core system during or after the pressure surge operation.

At block S504, a fluid chamber is configured based on the one or more operational parameters to store a first volume of a first fluid and a second volume of a second fluid used to pressurize the first fluid to a threshold pressure before start of the pressure surge. FIGS. 1-3, for example, illustrate first fluid chamber 104 configured to store a first volume of a pore liquid in first compartment 142, and store a second volume of a pore gas in second compartment 144. In some embodiments, the fluid chamber is configured to have a total volume that supports delivery of a desired surge volume and maintains the pore pressure above the desired threshold following conclusion of the surge event.

At block S506, a wellbore chamber is configured to store a second volume of the first fluid. FIGS. 1-3, for example, illustrate wellbore chamber 106 configured to store a volume of the first fluid that flows through the perforations of casing 136. In some embodiments, the wellbore chamber is configured to have a total volume that supports delivery of a desired surge volume and maintains the pore pressure above the desired threshold following conclusion of the surge event.

In some embodiments, where the wellbore pressure surge simulation system includes a second fluid chamber (e.g., the fluid chamber of a wellbore system), the second chamber is configured based on the one or more operational parameters to store a third fluid (e.g., wellbore liquid) and a fourth fluid (e.g., wellbore gas) used to pressurize the third fluid to a second threshold pressure. FIGS. 1-3, for example, illustrate second fluid chamber 110 configured to store a volume of wellbore liquid in first compartment 152 and a volume of wellbore gas stored in second chamber 154. Further, injection of the wellbore gas into second compartment 154 pressurizes the wellbore liquid. In one or more of such embodiments, a valve that fluidly connects the second fluid chamber to the wellbore chamber is turned to an open position after the start of the pressure surge operation to allow the pressurized first fluid to flow from the wellbore chamber and into the second fluid chamber.

In some embodiments, where the wellbore pressure surge simulation system includes a surge chamber, the surge chamber is configured to store a third volume of the first fluid. In one or more of such embodiments, the capacity of the surge chamber is configured to be greater than, approximately equal to, or exactly equal to the desired surge volume. In one or more of such embodiments, a valve that fluidly connects the surge chamber to the wellbore chamber is turned to an open position after the start of the pressure surge operation to allow the pressurized first fluid to flow from the wellbore chamber and into the surge chamber.

In some embodiments, where the wellbore pressure surge simulation system includes a wellbore system but does not include or does not utilize a surge chamber, the wellbore system (e.g., second fluid chamber 110 of wellbore system 111 of FIGS. 1 and 3) is configured to serve as the surge "sink." In one or more of such embodiments, an initial pressure and volume of the wellbore system that results in the desired volume of fluid surging through the core into the wellbore subsystem before the full apparatus reached pressure equilibrium are determined and set as the initial pressure and volumes of the wellbore system. In one or more of such embodiments, where the wellbore pressure surge simulation system includes a wellbore system and a surge chamber, a valve that fluidly connects the wellbore system with the pore system is configured to open after conclusion of the surge event. In one or more of such embodiments, the wellbore subsystem is initially configured to have a pressure equal to the post-surge equilibrium pressure, so that when valve 112 of FIG. 1 is opened, no pressure differentials or flow are introduced to the just surged-system. In one or more of such embodiments, the wellbore system is configured to depressurize in conjunction with the pore system, so that during unloading of the apparatus the core remains pressure-balanced with no unintended flow through the core in either direction.

At block S508, a flow restrictor is configured to restrict the fluid flow of the pressurized first fluid to a threshold rate after the start of the pressure surge simulation operation. In the embodiments of FIGS. 1-3, restrictor 108 is fluidly coupled to wellbore chamber 106 and is configured to restrict fluid flow of the pressurized first fluid to the threshold rate during the pressure surge operation. In one or more of such embodiments, the flow restrictor is configured to control the maximum fluid flowrate during the surge operation. In some embodiments, one or more flow restrictors of wellbore pressure surge simulation system are configured based on the one or more operational parameters. In one or more of such embodiments, a flow restrictor is figured based on requirements for a maximum (not-to-exceed) rate, and/or target duration of the surge event. In one or more of such embodiments, if the maximum rate (Qmax) and total surge volume (Vol) are defined, then the minimum time duration (tmin) can be established as tmin=Vol/Qmax. In one or more of such embodiments, if the minimum time duration and total surge volume are defined, then the maximum rate can be established as Qmax=Vol/tmin. In one or more of such embodiments, after Qmax is determined, a flow restrictor is configured based on the expected pressure drop and system parameters. In one or more of such embodiments, where the pressure drop (dP) and Qmax are known, and where the flow restrictor is an orifice plate, a diameter of the orifice place is determined by the following: hole diameter $D=sqrt[(4/pi)*(Qmax/C)*sqrt(rho/2dP)]$; where rho is the fluid density and C is the discharge coefficient. In one or more of such embodiments, where the pressure drop (dP) and Qmax are known, and where the flow restrictor is a needle valve, flow coefficient of the needle valve is determined by the following: flow coefficient $Cv=Qmax*sqrt(SG/dP)$; where SG=specific gravity of fluid. In some embodiments, the processes of FIG. 2 are performed by one or more processors.

Figure 6:
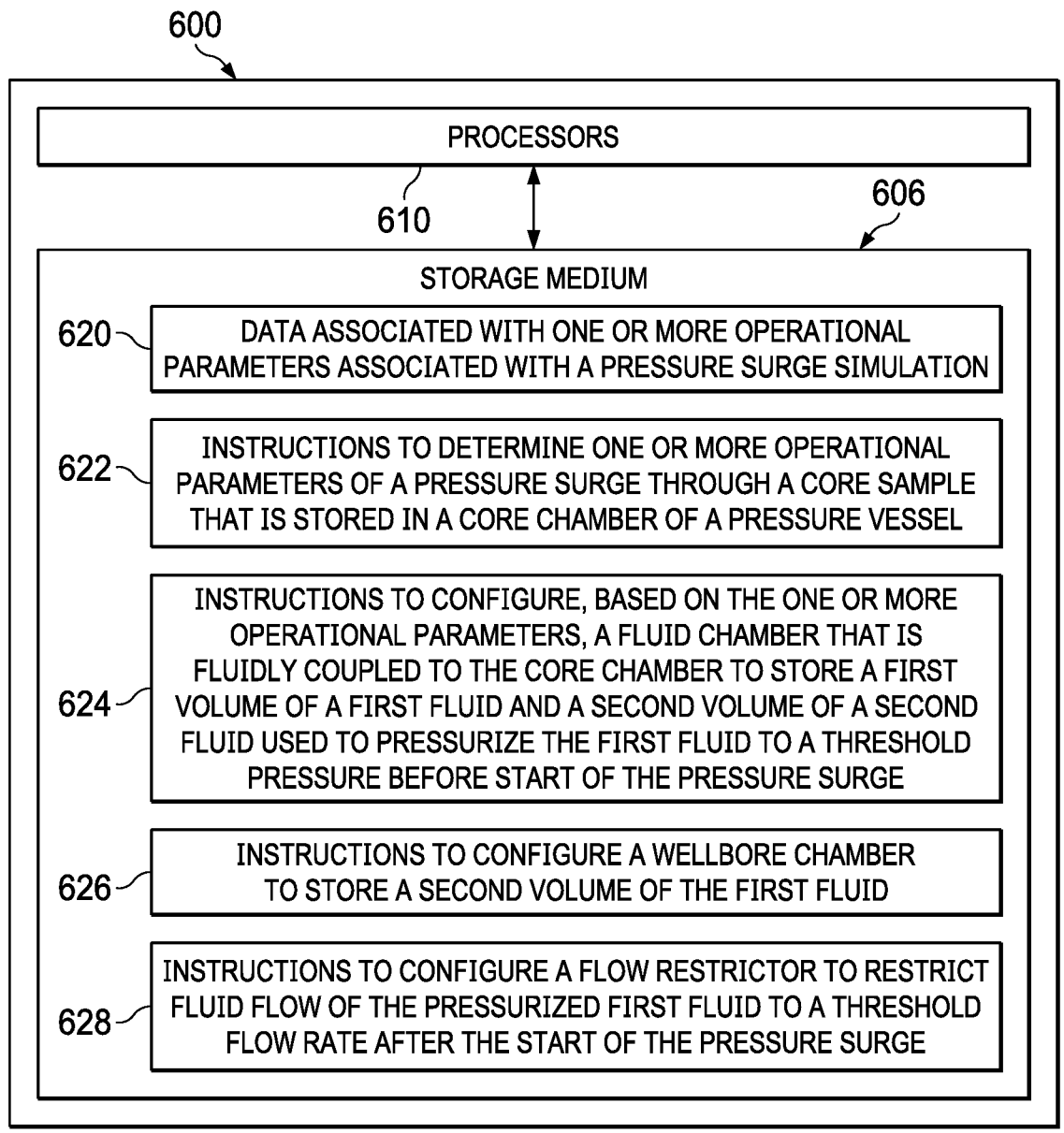
FIG. 6 is a block diagram of the wellbore pressure surge simulation system of FIG. 1.

In that regard, FIG. 6 is a block diagram of a system 600 operable to perform the operations illustrated in FIG. 5. System 600 refers to any electronic device having one or more processors operable to perform the processes illustrated in FIG. 5. Examples of system 600 include, but are desktop computers, laptop computers, tablet computers, smartphones, PDAs, server computers, and similar electronic devices. In some embodiments, system 600 is a component of a pressure vessel. System 600 includes a storage medium 606 and processors 610. Storage medium 606 may be formed from data storage components such as, but not limited to, read-only memory (ROM), random access memory (RAM), flash memory, magnetic hard drives, solid-state hard drives, CD-ROM drives, DVD drives, floppy disk drives, as well as other types of data storage components and devices. In some embodiments, storage medium 606 includes multiple data storage devices. In further embodiments, the multiple data storage devices may be physically stored at different locations. Data associated with one or more operational parameters associated with a pressure surge simulation operation are stored at a first location 620 of storage medium 606.

As shown in FIG. 6, instructions to determine one or more operational parameters of a pressure surge simulation operation through a core sample that is stored in a core chamber of a pressure vessel are stored at a second location 622 of storage medium 606. Further, instructions to configure, based on the one or more operational parameters, a fluid chamber that is fluidly coupled to the core chamber to store a first volume of a first fluid and a second volume of a second fluid used to pressurize the first fluid to a threshold pressure before start of the pressure surge simulation operation are stored at a third location 624 of the storage medium 606. Further, instructions to configure a wellbore chamber to store a second volume of the first fluid are stored at a fourth location 626 of storage medium 606. Further, instructions to configure a flow restrictor to restrict fluid flow of the pressurized first fluid to a threshold flow rate after the start of the pressure surge simulation operation are stored at a fifth location 628 of storage medium 606. In some embodiments, system 600 also performs or requests a pressure vessel to perform operations described in process 500. In some embodiments, additional instructions to perform operations described herein are also stored in storage medium 606.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure.

Clause 1, a wellbore pressure surge simulation system, comprising: a core chamber configured to store a core sample of a downhole formation inside the core chamber; a fluid chamber that is fluidly connected to the core chamber and having a first compartment that is configured to store a first fluid and a second compartment that is configured to store a second fluid; a wellbore chamber positioned adjacent to the core chamber and configured to store the first fluid; and a flow restrictor configured to restrict fluid flow from the wellbore chamber.

Clause 2, the wellbore pressure surge simulation system of clause 1, further comprising: a second fluid chamber having a first compartment that is configured to store a third fluid and a second compartment that is configured to store a fourth fluid; and a valve configured to turn from a first position to a second position to fluidly connect the second fluid chamber to the wellbore chamber.

Clause 3, the wellbore pressure surge simulation system of clause 2, wherein the fluid chamber comprises a first movable barrier that is positioned between the first compartment and the second compartment of the fluid chamber, and wherein the second fluid chamber comprises a second movable barrier that is positioned between the first compartment and the second compartment of the second fluid chamber.

Clause 4, the wellbore pressure surge simulation system of clauses 2 or 3, wherein the core chamber and the fluid chamber are pressurized at a first pressure, and wherein the second fluid chamber is pressurized at a second pressure that is less than the first pressure.

Clause 5, the wellbore pressure surge simulation system of any of clauses 1-4, further comprising a surge chamber configured to receive the first fluid; and a valve configured to turn from a first position to a second position to fluidly connect the surge chamber to the wellbore chamber.

Clause 6, the wellbore pressure surge simulation system of clause 1, wherein fluid chamber comprises a movable barrier positioned between the first compartment and the second compartment.

Clause 7, the wellbore pressure surge simulation system of any of clauses 1-6, wherein the core chamber and the fluid chamber are pressurized at a pressure that matches a downhole pressure.

Clause 8, the wellbore pressure surge simulation system of any of clauses 1-7, further comprising a filter configured to prevent particles greater than a threshold size from flowing into the flow restrictor.

Clause 9, the wellbore pressure surge simulation system of any of clauses 1-8, wherein the core chamber and the wellbore chamber are in pressure communication with each other.

Clause 10, the wellbore pressure surge simulation system of any of clauses 1-9, wherein the core chamber the fluid chamber, and the wellbore chamber are chambers of a pressure vessel.

Clause 11, a method to perform a pressure surge simulation, comprising: flowing a first fluid into a first compartment of a fluid chamber; flowing the first fluid through a core chamber into a wellbore chamber; flowing a second fluid into a second compartment of the fluid chamber to pressurize the first fluid to a first threshold pressure; and after start of a pressure surge simulation operation, restricting fluid flow of the pressurized first fluid from the wellbore chamber to a threshold flow rate while maintaining a pressure of the pressurized first fluid at or above a second threshold pressure during the pressure surge simulation operation, wherein the second threshold pressure is lower than the first threshold pressure.

Clause 12, the method to perform the pressure surge simulation of clause 11, further comprising: flowing a third fluid into a first compartment of a second fluid chamber; flowing a fourth fluid into a second compartment of the second fluid chamber to pressurize the third fluid to a third threshold pressure that is less than the first and the second threshold pressures; preventing fluid flow into the second fluid chamber prior to the start of the pressure surge simulation operation; and after the start of the pressure surge simulation operation, flowing the pressurized first fluid from the wellbore chamber into the second fluid chamber at the threshold flow rate.

Clause 13, the method of clause 12, further comprising after the start of the pressure surge simulation operation, turning a valve that is fluidly connected to the second fluid chamber from a first position to a second position to fluidly connect the second fluid chamber to the wellbore chamber.

Clause 14, the method of clauses 12 or 13, further comprising: determining the third threshold pressure; and determining an amount of the fourth fluid to flow into the second compartment of the second fluid chamber based on the third threshold pressure.

Clause 15, the method of any of clauses 11-14, further comprising: after the start of the pressure surge simulation operation, turning a valve that is fluidly connected to a surge chamber from a first position to a second position to fluidly connect the surge chamber to the wellbore chamber; and flowing the pressurized first fluid from the wellbore chamber to the surge chamber at the threshold flow rate.

Clause 16, the method of any of clauses 11-15, further comprising: determining the first threshold pressure; and determining an amount of the second fluid to flow into the second compartment based on the first threshold pressure.

Clause 17, the method of clause 16, further comprising determining an amount of the first fluid in the first compartment, the core chamber, and the wellbore chamber, wherein determining the amount of the second fluid to flow into the second compartment is based on the amount of the first fluid in the first compartment, the core chamber, and the wellbore chamber.

Clause 18, a method to configure a pressure surge simulation system, the method comprising: determining one or more operational parameters of a pressure surge simulation operation through a core sample that is stored in a core chamber of a pressure vessel; configuring, based on the one or more operational parameters, a fluid chamber that is fluidly coupled to the core chamber to store a first volume of a first fluid and a second volume of a second fluid used to pressurize the first fluid to a threshold pressure before start of the pressure surge simulation operation; configuring a wellbore chamber to store a second volume of the first fluid; and configuring a flow restrictor to restrict fluid flow of the pressurized first fluid to a threshold flow rate after the start of the pressure surge simulation operation.

Clause 19, the method of clause 18, further comprising: configuring, based on the one or more operational parameters, a second fluid chamber to store a third fluid and a fourth fluid used to pressurize the third fluid to a second threshold pressure that is less than the threshold pressure before the start of the pressure surge simulation operation; and configuring a valve that is fluidly connected to the second fluid chamber to turn from a first position to a second position after the start of the pressure surge simulation operation to fluidly connect the wellbore chamber to the second fluid chamber.

Clause 20, the method of clauses 18 or 19, further comprising: configuring, based on the one or more operational parameters, a surge chamber to store a third volume of the first fluid; and configuring a valve that is fluidly connected to the surge chamber to turn from a first position to a second position after the start of the pressure surge simulation operation to fluidly connect the wellbore chamber to the surge chamber.

As used herein, the singular forms "a", "an", and "the" are intended to include the plural forms as well, unless the context clearly indicates otherwise. It will be further understood that the terms "comprise" and/or "comprising," when used in this specification and/or in the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

What is claimed is:

1. A wellbore pressure surge simulation system, comprising:
    a core chamber configured to store a core sample of a downhole formation inside the core chamber;
    a fluid chamber that is fluidly connected to the core chamber and having a first compartment that is configured to store a first fluid and a second compartment that is configured to store a second fluid;
    a movable barrier that is positioned between the first compartment and the second compartment of the fluid chamber;
    a wellbore chamber positioned adjacent to the core chamber and configured to store the first fluid; and
    a flow restrictor configured to restrict fluid flow from the wellbore chamber.

2. The wellbore pressure surge simulation system of claim 1, further comprising:
    a second fluid chamber having a first compartment that is configured to store a third fluid and a second compartment that is configured to store a fourth fluid; and
    a valve configured to turn from a first position to a second position to fluidly connect the second fluid chamber to the wellbore chamber.

3. The wellbore pressure surge simulation system of claim 2, wherein the second fluid chamber comprises a second movable barrier that is positioned between the first compartment and the second compartment of the second fluid chamber.

4. The wellbore pressure surge simulation system of claim 2, wherein the core chamber and the fluid chamber are pressurized at a first pressure, and wherein the second fluid chamber is pressurized at a second pressure that is less than the first pressure.

5. The wellbore pressure surge simulation system of claim 1, further comprising:
    a surge chamber configured to receive the first fluid; and
    a valve configured to turn from a first position to a second position to fluidly connect the surge chamber to the wellbore chamber.

6. The wellbore pressure surge simulation system of claim 1, wherein fluid chamber comprises a third movable barrier positioned between the first compartment and the second compartment.

7. The wellbore pressure surge simulation system of claim 1, wherein the core chamber and the fluid chamber are pressurized at a pressure that matches a downhole pressure.

8. The wellbore pressure surge simulation system of claim 1, further comprising a filter configured to prevent particles greater than a threshold size from flowing into the flow restrictor.

9. The wellbore pressure surge simulation system of claim 1, wherein the core chamber and the wellbore chamber are in pressure communication with each other.

10. The wellbore pressure surge simulation system of claim 1, wherein the core chamber, the fluid chamber, and the wellbore chamber are chambers of a pressure vessel.

11. A method to perform a pressure surge simulation, comprising:
    flowing a first fluid into a first compartment of a fluid chamber;
    flowing the first fluid through a core chamber into a wellbore chamber;
    flowing a second fluid into a second compartment of the fluid chamber to pressurize the first fluid to a first threshold pressure; and
    after start of a pressure surge simulation operation, restricting fluid flow of the pressurized first fluid from the wellbore chamber to a threshold flow rate while maintaining a pressure of the pressurized first fluid at or above a second threshold pressure during the pressure surge simulation operation, wherein the second threshold pressure is lower than the first threshold pressure.

12. The method to perform the pressure surge simulation of claim 11, further comprising:
flowing a third fluid into a first compartment of a second fluid chamber;
flowing a fourth fluid into a second compartment of the second fluid chamber to pressurize the third fluid to a third threshold pressure that is less than the first and the second threshold pressures;
preventing fluid flow into the second fluid chamber prior to the start of the pressure surge simulation operation; and
after the start of the pressure surge simulation operation, flowing the pressurized first fluid from the wellbore chamber into the second fluid chamber at the threshold flow rate.

13. The method of claim 12, further comprising after the start of the pressure surge simulation operation, turning a valve that is fluidly connected to the second fluid chamber from a first position to a second position to fluidly connect the second fluid chamber to the wellbore chamber.

14. The method of claim 12, further comprising:
determining the third threshold pressure; and
determining an amount of the fourth fluid to flow into the second compartment of the second fluid chamber based on the third threshold pressure.

15. The method of claim 11, further comprising:
after the start of the pressure surge simulation operation, turning a valve that is fluidly connected to a surge chamber from a first position to a second position to fluidly connect the surge chamber to the wellbore chamber; and
flowing the pressurized first fluid from the wellbore chamber to the surge chamber at the threshold flow rate.

16. The method of claim 11, further comprising:
determining the first threshold pressure; and
determining an amount of the second fluid to flow into the second compartment based on the first threshold pressure.

17. The method of claim 16, further comprising determining an amount of the first fluid in the first compartment, the core chamber, and the wellbore chamber, wherein determining the amount of the second fluid to flow into the second compartment is based on the amount of the first fluid in the first compartment, the core chamber, and the wellbore chamber.

18. A method to configure a pressure surge simulation system, the method comprising:
determining one or more operational parameters of a pressure surge simulation operation through a core sample that is stored in a core chamber of a pressure vessel;
configuring, based on the one or more operational parameters, a fluid chamber that is fluidly coupled to the core chamber to store a first volume of a first fluid and a second volume of a second fluid used to pressurize the first fluid to a threshold pressure before start of the pressure surge simulation operation;
configuring a wellbore chamber to store a second volume of the first fluid;
moving a movable barrier that is positioned between the first compartment and the second compartment of the fluid chamber; and
configuring a flow restrictor to restrict fluid flow of the pressurized first fluid to a threshold flow rate after the start of the pressure surge simulation operation.

19. The method of claim 18, further comprising:
configuring, based on the one or more operational parameters, a second fluid chamber to store a third fluid and a fourth fluid used to pressurize the third fluid to a second threshold pressure that is less than the threshold pressure before the start of the pressure surge simulation operation; and
configuring a valve that is fluidly connected to the second fluid chamber to turn from a first position to a second position after the start of the pressure surge simulation operation to fluidly connect the wellbore chamber to the second fluid chamber.

20. The method of claim 18, further comprising:
configuring, based on the one or more operational parameters, a surge chamber to store a third volume of the first fluid; and
configuring a valve that is fluidly connected to the surge chamber to turn from a first position to a second position after the start of the pressure surge simulation operation to fluidly connect the wellbore chamber to the surge chamber.

* * * * *